United States Patent
Ogawa

(10) Patent No.: US 8,812,872 B2
(45) Date of Patent: Aug. 19, 2014

(54) MEMORY MANAGMENT METHOD

(75) Inventor: Mutsumi Ogawa, Kyoto (JP)

(73) Assignee: Hypertech Co., Ltd., Kyoto (JP)

( * ) Notice: Subject to any disclaimer, the term of this patent is extended or adjusted under 35 U.S.C. 154(b) by 0 days.

(21) Appl. No.: 13/577,570

(22) PCT Filed: Feb. 8, 2010

(86) PCT No.: PCT/JP2010/051747
§ 371 (c)(1),
(2), (4) Date: Aug. 7, 2012

(87) PCT Pub. No.: WO2011/096073
PCT Pub. Date: Aug. 11, 2011

(65) Prior Publication Data
US 2012/0311350 A1 Dec. 6, 2012

(51) Int. Cl.
*G06F 21/00* (2013.01)
*G06F 21/14* (2013.01)
*G06F 12/14* (2006.01)
*G06F 21/78* (2013.01)
*G06F 21/79* (2013.01)
*G06F 21/74* (2013.01)
*G06F 21/80* (2013.01)

(52) U.S. Cl.
CPC .............. *G06F 12/145* (2013.01); *G06F 21/14* (2013.01); *G06F 12/1048* (2013.01); *G06F 2221/2107* (2013.01); *G06F 2221/2115* (2013.01); *G06F 2221/2105* (2013.01); *G06F 21/78* (2013.01); *G06F 21/79* (2013.01); *G06F 21/74* (2013.01); *G06F 21/80* (2013.01)
USPC ............................ 713/190; 711/163; 711/164

(58) Field of Classification Search
USPC .................................................. 711/163–164
See application file for complete search history.

(56) References Cited

U.S. PATENT DOCUMENTS

| | | | |
|---|---|---|---|
| 2001/0014157 A1 | 8/2001 | Hashimoto et al. | |
| 2001/0018736 A1* | 8/2001 | Hashimoto et al. | ............... 713/1 |
| 2001/0166069 | 7/2005 | Hashimoto et al. | |
| 2007/0266438 A1* | 11/2007 | Rodgers et al. | ................. 726/26 |
| 2008/0253571 A1* | 10/2008 | Rits | ............... 380/277 |

FOREIGN PATENT DOCUMENTS

| | | |
|---|---|---|
| JP | 2001-230770 A | 8/2001 |
| JP | 2004-272816 A | 9/2004 |
| JP | 2005-071055 A | 3/2005 |
| JP | 2010-039576 A | 2/2010 |

OTHER PUBLICATIONS

International Search Report for PCT/JP2010/051747; Apr. 20, 2010.

* cited by examiner

*Primary Examiner* — Ghazal Shehni
(74) *Attorney, Agent, or Firm* — Pearne & Gordon LLP

(57) ABSTRACT

In the conventional method of maintaining the confidential a program, wherein a program to be executed in an information processing device is stored in a hard disk, etc., in an encrypted state and the program is decrypted when it is executed, because a decrypted program is written in memory, the program may be illicitly analyzed by a third person. Provided is memory management method wherein code information or data of a program written in a virtual memory is data which is encrypted and inaccessible by a CPU, and when code fetching or data access to the encrypted area occurs, an interruption process is performed wherein with respect to a management unit of the memory management device including the area, an inaccessible state is changed to an accessible state to perform decryption.

4 Claims, 8 Drawing Sheets

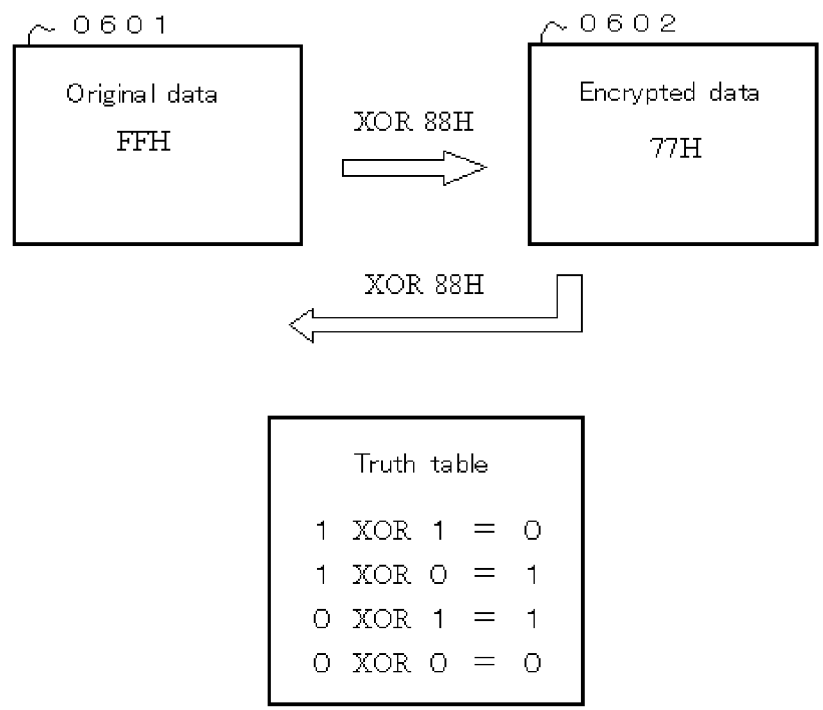

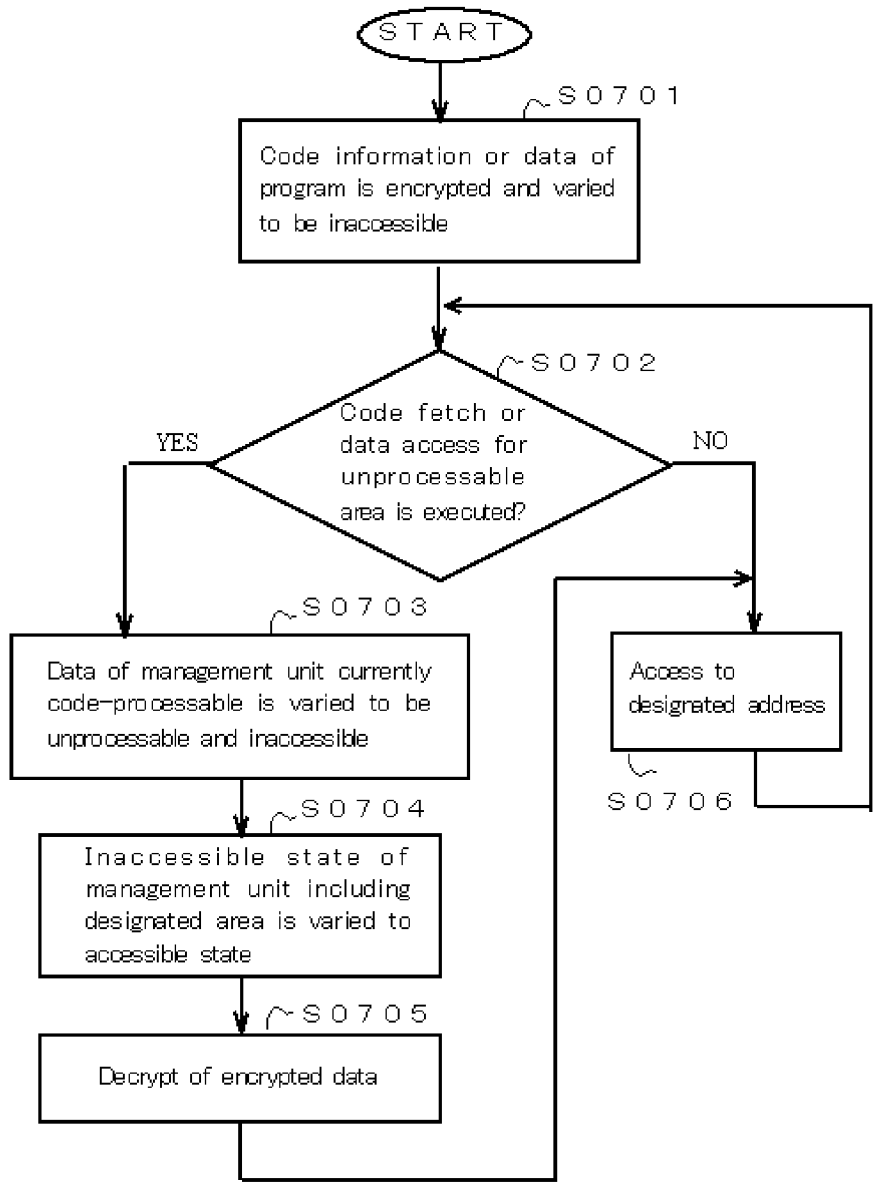

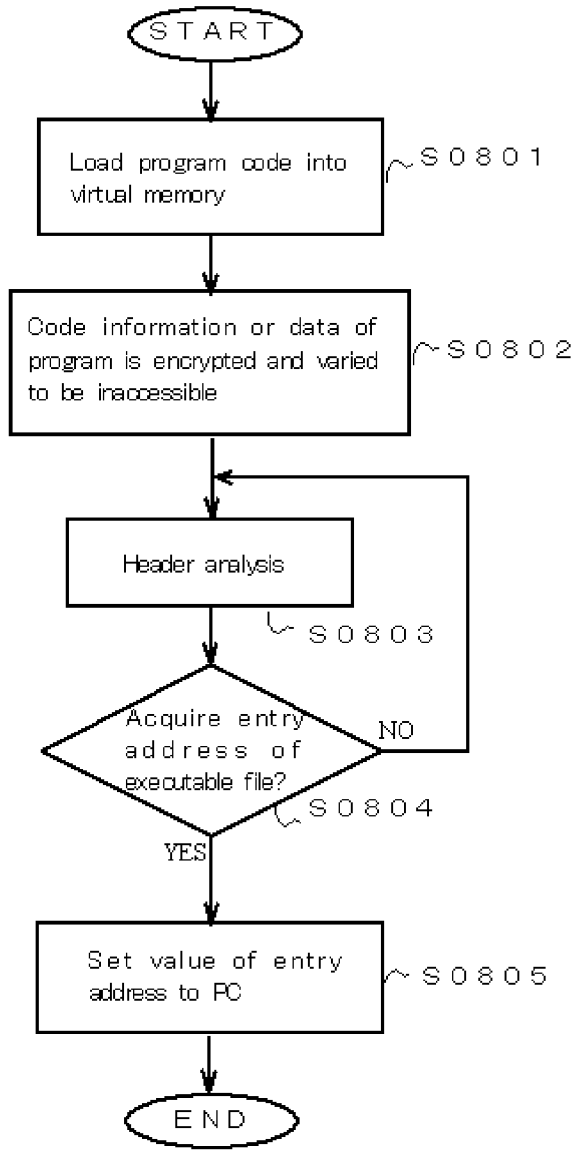

MEMORY MANAGMENT METHOD

FIELD OF THE INVENTION

The present invention relates to memory management method.

BACKGROUND ART

Conventionally, it is well-know that an encrypted program executable by an information processing device is stored in a storage, and decrypted upon execution of the program, thereby securing confidentiality of the program. However, the decrypted program is loaded into a memory, so that unauthorized third party can analyze the program.

In order to reduce this deficiency, in Japanese Unexamined Patent Application Publication No. 2005-71055, the decrypted program is loaded at different positions in the memory with respect to each device, or on the basis of a parameter such as time.

Patent Reference 1: Japanese Unexamined Patent Application Publication No. 2005-71055

DISCLOSURE OF THE INVENTION

Problems that the Invention Tries to Solve

However, in the above conventional technology, the decrypted program exists in the memory, so that the possibility of unauthorized analysis by the third party still remains.

Means for Solving the Problems

In order to solve the above deficiency, in the present invention, code information of a program loaded into a virtual memory is encrypted, and varied to be the data, where data reading or data writing is impossible from a CPU, and when receiving a data reading request or a data writing request by the CPU for the code information, an interrupt process for varying the inaccessible state of a management unit of a memory management device including the encrypted area to an accessible state and for decryption is executed.

Specifically, a first aspect of the invention is a memory management method that is for processing code information of a program loaded into a virtual memory, the method comprising encrypting the code information, and varying the code information to data, where data reading or data writing is impossible from a CPU; when receiving the data reading request or the data writing request by the CPU for the code information, executing an interrupt process for varying the inaccessible state of a management unit of a memory management device including the encrypted area to an accessible state, and for decrypting the data; and when the data reading request or data writing request designates information of other management unit, executing a recursive process for re-encrypting the data of the management unit, where the data reading request or the data writing request has become possible by the step for executing the interrupt process.

A second aspect of the invention is the memory management method according to the first aspect, wherein the encryption is executed before a program counter designates an entry address of an executable file upon program activation.

A third aspect of the invention is a program for causing a computer to execute a process for code information of a program loaded into a virtual memory, comprising encrypting the code information, and varying the code information to data, where data reading or data writing is impossible from a CPU; when receiving the data reading request or the data writing request by the CPU for the code information, executing an interrupt process for varying the inaccessible state of a management unit of a memory management device including the encrypted area to an accessible state, and for decrypting the data; and when the data reading request or data writing request designates information of other management unit, executing a recursive process for re-encrypting the data of the management unit, where the data reading request or the data writing request has become possible by the step for executing the interrupt process.

A fourth aspect of the invention is the program according to the third aspect, wherein the encryption is executed before a program counter designates an entry address of an executable file upon program activation.

A fifth aspect of the invention is a computer-readable storage medium storing a program for causing a computer to execute a process for code information of a program loaded into a virtual memory, comprising encrypting the code information, and varying the code information to data, where data reading or data writing is impossible from a CPU; when receiving the data reading request or the data writing request by the CPU for the code information, executing an interrupt process for varying the inaccessible state of a management unit of a memory management device including the encrypted area to an accessible state, and for decrypting the data; and when the data reading request or data writing request designates information of other management unit, executing a recursive process for re-encrypting the data of the management unit, where the data reading request or the data writing request has become possible by the step for executing the interrupt process.

A sixth aspect of the invention is the computer-readable storage medium according to the fifth aspect, wherein the encryption is executed before a program counter designates an entry address of an executable file upon program activation.

Effects of the Invention

According to the memory management method of the present invention, it is possible to encrypt the code information of the program loaded into the virtual memory, and to vary the code information to be inaccessible from the CPU, thereby preventing the unauthorized analysis on the memory by the third party. Further, there is a case that memory dump is possible by utilizing a privileged mode of kernel, which is the core of an OS and executes process control and memory management etc. Even in this case, the memory management method of the present invention has an effect similar to encryption of memory itself, so that content of the data stored in the memory cannot be known, thereby providing high level of security.

Moreover, according to the memory management method of the present invention, when code fetch or data access for the encrypted area is executed, an interrupt process for varying the inaccessible state of a management unit of a memory management device including the encrypted area to an accessible state is executed, and only the data, where the code fetch or data access is impossible, of the accessible management unit is decrypted to a processible state for the CPU. Therefore, a user can perform operations without any inconvenience.

DETAILED DESCRIPTION OF THE INVENTION

Hereinafter, embodiments of the present invention will be described with reference to diagrams. The present invention is not to be limited to the above embodiments and able to be embodied in various forms without departing from the scope thereof.

Note that, the following respective components can be implemented by a hardware, a software loaded into a memory for controlling the hardware, or both hardware and software. Specifically, in the case of utilizing a computer, examples of the above include hardware components configured by a CPU, a memory, a bus, a hard disk drive, a reading drive for CD-ROM or DVD-ROM, input/output port for transmission/reception, an interface, and other peripheral devices; and driver program for controlling the above hardware, and other application programs.

Moreover, the present invention can be implemented not only as a method but also as an apparatus or a system. Moreover, a portion of such inventions may be configured as software. Furthermore, a software product used for causing a computer to execute such software, and the recording medium, in which the software is installed, should be included in the technical scope of the present invention (the same applies throughout the entire specification).

First Embodiment

Concept of First Embodiment

The present invention is a memory management method, where code information of a program loaded into a virtual memory is encrypted and varied to be inaccessible from a CPU, and when receiving a data reading request or a data writing request by the CPU for the code information, an interrupt process for varying the inaccessible state of a management unit of a memory management device including the encrypted area to an accessible state and decryption are executed. The data reading request or the data writing request is, for example, the designation of the address of the target for data reading by the program counter.

<Configuration of First Embodiment>

FIG. 1 is a diagram exemplifying hardware configuration of a memory management device as an information processing device of the embodiment of the present invention. As shown in FIG. 1, a memory management device (0100) comprises a hard-disk drive (0101), a CPU (0102), a memory management unit (0103), a main memory (0104), and a system bus (0105).

The hard-disk drive (0101) (hereinafter, referred to as HDD) stores some program files (0106) and data etc. a HDD controller executes control of access to the HDD.

The main memory (0104) provides work area for reading and loading of a program to be executed, stored in the HDD, and data area for temporarily storing data. For example, the application program (0109) is loaded from the HDD into the main memory by a predetermined size of page unit (1 page=4 kilobyte) upon execution, and is stored in the work area in the main memory. Moreover, the main memory stores the operating system (hereinafter, referred to as OS) (0108). The OS is loaded from the HDD into the main memory upon activation of the information processing device.

Note that a plurality of addresses are respectively assigned to the main memory and the HDD, and the program to be executed by the CPU specifies and accesses to the memory address, thereby mutually exchanging data, and processing the data.

The main memory comprises a physical memory-virtual memory conversion table (0110). The physical memory-virtual memory conversion table is a table for management of mapping on a page basis between the virtual memory address space and the physical memory space as an address space in the main memory. On the basis of this conversion table, assignment of the pages in the physical memory address space to the respective pages of the program placed in the virtual memory address space is determined. In general, a size of the virtual memory address space is larger than that of the physical memory address space. In this case, a part of the pages of the program placed in the virtual memory address space is placed in the physical memory space.

The CPU (0102) executes the application program and OS etc, which have been loaded into the main memory. The system bus (0105) carries out mutual connection among the memory management unit (0103), the main memory, and the CPU.

FIG. 2 is a diagram showing a correspondence between the page of the virtual memory address space, where the program is placed, and the page of the physical memory address space. FIG. 2 shows that the pages in the physical memory space (physical page) designated by arrows are assigned to the respective pages of the virtual memory address (virtual page). Thus, the code information of the program can be loaded into the virtual memory. Note that the 'code information of program' is information where source code described in accordance with of description specification of program language is converted to binary code. In addition to EXE file, an example of the program may include DLL (Dynamic-Link Library) file referred by the EXE file. Moreover, the 'code information of program' may include information source as a target for processing by the program. For example, various information such as graphic information and various numerical values utilized for execution of the program may be included.

FIG. 3 is a diagram exemplifying a program placed in the memory space. The shaded portion in FIG. 3 is encrypted. As shown in FIG. 3, a header section included in the program is not encrypted, and only the code section is encrypted. Although the data section can be encrypted, FIG. 3 shows a case of no-encryption. Moreover, the encryption includes not only complex conversion but also a conversion by simple operation. For example, simply adding 1 to each value, simply subtracting 1 from each value, or simply multiplying by a specific numerical value may be included.

At the outset, in response to a program activation instruction, a header analysis is executed, and an entry address (e.g., address 4000) of an executable file is acquired, thereby setting a program counter (hereinafter, referred to as PC) to the numerical value of the entry address. The CPU accesses to the code information of the address indicated by the PC, thereby executing data reading (or data writing) (in the figure, this is expressed by 'code fetch' or 'data access' and the same applies to other figures), and analysis. (A) Note that in this case, data reading (or date writing) of the code information of the address 4000 is impossible, so that an error code occurs. (B) The occurrence of the error code triggers an interrupt process. Subsequently, the management unit of the memory management device including the inaccessible area (e.g., page unit: 4 kilobyte) is varied to an accessible state. (C) This processing is executed, for example, by rewriting flag register indicating an access state of the page. Note that the data reading is a wide concept including fetch of the code information by the CPU.

Subsequently, FIG. 4 shows the memory where the second page (head address 4000) is in an accessible state. Similar to the above, the occurrence of the error code triggers rewriting only the data, where the data reading or data writing is impossible for the CPU, of the management unit varied to be accessible by the interrupt process, thereby executing the rewriting the data to the processable state. (D) This process is executed by the decryption program called by the interrupt process. The decryption program may include an execution of a predetermined function (examples of the decryption program will be described). The decryption program decodes data of a page (4 kilobyte), and writes it over the second page as the original memory area. Therefore, the CPU can execute the data reading or data writing of the second page, Here, the CPU increments the PC (Program Counter), thereby sequentially executing the program. There is a case where the PC designates an area other than the area, where the data reading or data writing is possible.

Subsequently, FIG. 5 shows that the PC is accessing to address 8000. The code fetch (or data access) for the code information of the address 8000 is impossible for the CPU, thereby causing the error code. (E) As described above, the error code triggers the interrupt process for making the accessible state, and decryption. (F) Here, in addition to the above, the CPU executes a recursive process for re-encrypting the data of the management unit, where the code fetch (or data access) is possible. (G) This recursive process may include writing of the data except the proper code information over the page triggered by the interrupt process in addition to the execution of encryption program called by the interrupt process. Note that the encryption program may include an execution of a predetermined function (examples of the encryption program will be described). Finally, the flag register indicating an access state to the memory area is rewritten to the inaccessible state.

Moreover, the encryption can be executed before the program counter designates the entry address of the executable file upon program activation. In this case, the process of making an unprocessable state may be executed immediately upon loading the program into the memory. Moreover, a series of program loading, encryption, and overwriting may be executed with respect to each predetermined unit, thereby making an unprocessable state.

Here, the encryption/decryption of the code information is described. The encryption of the code information can be executed by respectively executing four arithmetic operations (addition, subtraction, multiplication and division) of a predetermined constant (e.g., 2) for the original data. The decryption can be respectively executed by subtraction, addition, division and multiplication of the predetermined constant.

Moreover, as shown in FIG. 6, the encryption/decryption can be executed by the exclusive OR. Specifically, XOR operation of 88H for FFH as the original data (0601) is executed, thereby acquiring 77H. This acquired value is encrypted data (0602). On the other hand, when decrypting the encrypted data, similar to the above, the XOR operation of 88H for the encrypted data 77H is executed. As a result, FFH is acquired, thereby acquiring the original data by decryption. Note that it is necessary to secure no occurrence of overflow.

Moreover, a private-key encryption such as DES, FEAL, MISTY, and IDEA may be used. Moreover, a public-key encryption such as RSA, elliptic curve, and ElGamal may be used. In the public-key encryption, a program producer etc. distributes a decryption program with a public key corresponding to a private key in addition to an encryption program. Although the encryption program and the decryption program work as a unit, they are not necessarily to be the same file.

<Processing Flow of First Embodiment>

FIG. 7 is a flowchart of a process of the memory management method of this embodiment. Note that, the following processes may be executed by a program executable for a computer, and the program may be stored in a computer-readable storage medium (the same applies to other processes in this specification).

At the outset, the code information or data of the program loaded into the virtual memory is encrypted and varied to be inaccessible data (encryption step S0701).

Subsequently, it is determined whether code fetch or data access for the encrypted area for execution of the program is executed (determination step for area designation S0702), and if it is determined that the encrypted area has been designated, the data of the management unit, where the code fetch or data access is currently possible for the CPU, is varied to be code-unprocessable and inaccessible data (recursive step S0703).

Note that in the determination step for area designation (S0702), if it is determined that the PC has designated the processable area, an access to the designated address is executed, and the PC is carried on (access step for designated address S0706) while repeating the determination step for area designation (S0702).

Subsequently, by the interrupt process, the inaccessible state of the management unit of the memory management device including the above area is varied to the accessible state (variation step for accessible state S0704). Simultaneously, only the data, where the data reading or data writing is impossible for the CPU, of the management unit varied to be accessible by the interrupt process, thereby executing the rewriting the data to the processable state and executing decryption (decryption step S0705). Subsequently, access step for designated address (S0706) is executed, thereby accessing to the designated address and carrying on PC.

FIG. 8 is a flowchart of a process for making unprocessable state at program activation. At the outset, the program code is loaded into the virtual memory (Loading step S0801). Subsequently, the code information or data of the program is encrypted and made to be inaccessible data (encryption step S0802). Subsequently, header analysis is executed until the entry address of the executable file (header analysis step S0803 and S0804). Finally, the acquired value of the entry address is set to the program counter (PC setting step S0805).

<Brief Description of Effects of First Embodiment>

According to the memory management method of the present invention, it is possible to encrypt the code information of the program loaded into the virtual memory, and to vary the code information to be inaccessible from the CPU, thereby preventing the unauthorized analysis on the memory by the third party. Further, there is a case that memory dump is possible by utilizing a privileged mode of kernel, which is the core of an OS and executes process control and memory management etc. Even in this case, the memory management method of the present invention has an effect similar to encryption of memory itself, so that content of the data stored in the memory cannot be known, thereby providing high level of security.

Moreover, according to the memory management method of the present invention, when code fetch or data access for the encrypted area is executed, an interrupt process for varying the inaccessible state of a management unit of a memory management device including the encrypted area to an accessible state is executed, and only the data, where the code fetch or data access is impossible, of the accessible management unit is decrypted to a processable state for the CPU. Therefore, a user can perform operations without any inconvenience.

BRIEF DESCRIPTION OF THE DRAWINGS

FIG. 6 is a diagram exemplifying an encryption utilizing exclusive OR.

FIG. 7 is a flowchart of a process.

FIG. 8 is a flowchart of a process at program activation.

DESCRIPTION OF REFERENCE NUMERALS

Figure 1:
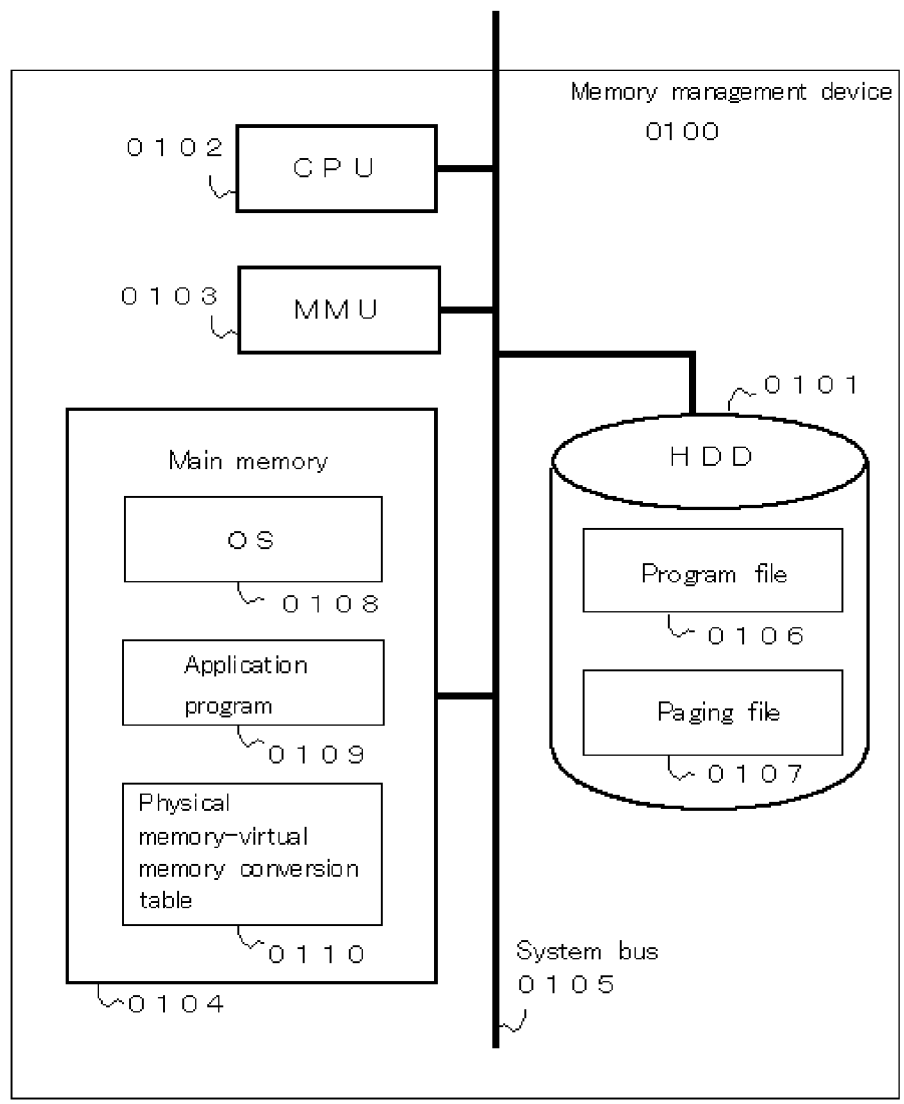
FIG. 1 is a diagram exemplifying hardware configuration of a memory management device.
Figure 2:
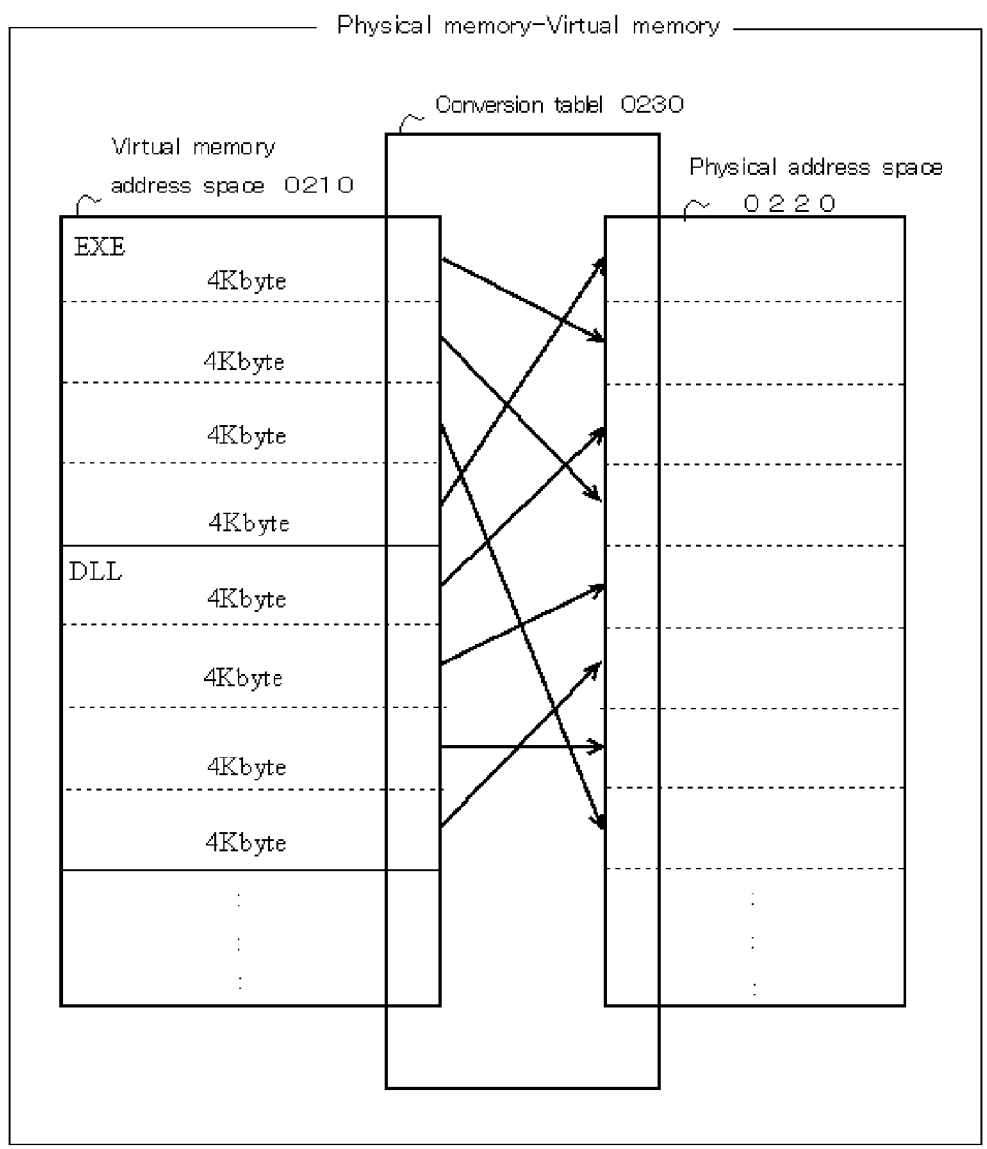
FIG. 2 is a diagram showing a correspondence between virtual memory address space and real address space.
Figure 3:
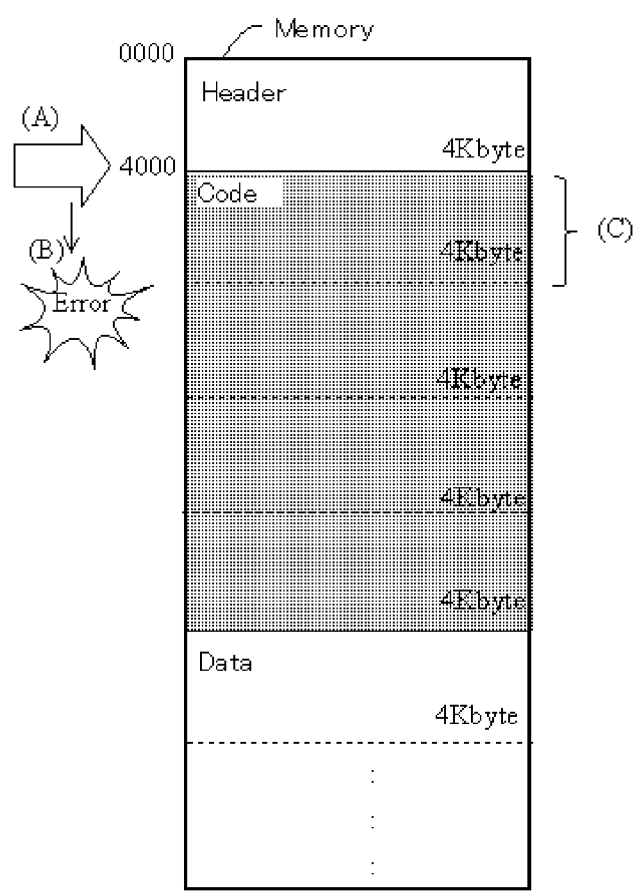
FIG. 3 is a diagram exemplifying a program placed in memory space (1).
Figure 4:
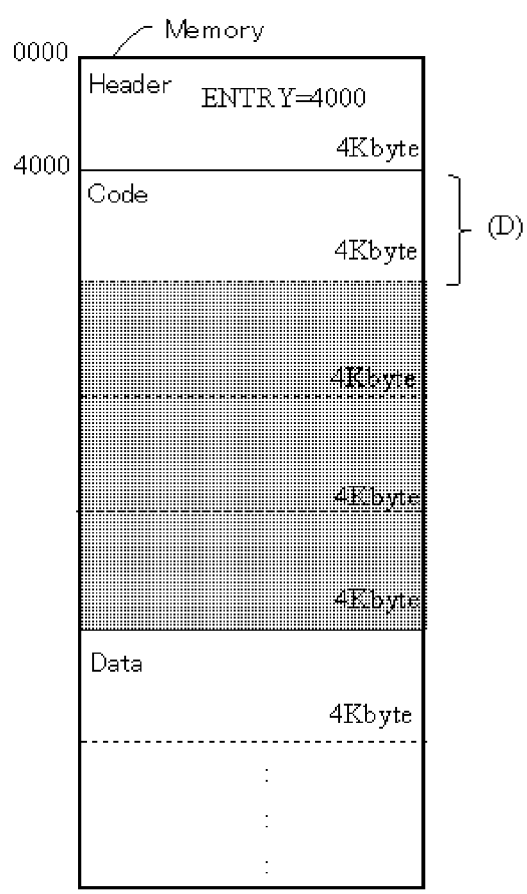
FIG. 4 is a diagram exemplifying a program placed in memory space (2).
Figure 5:
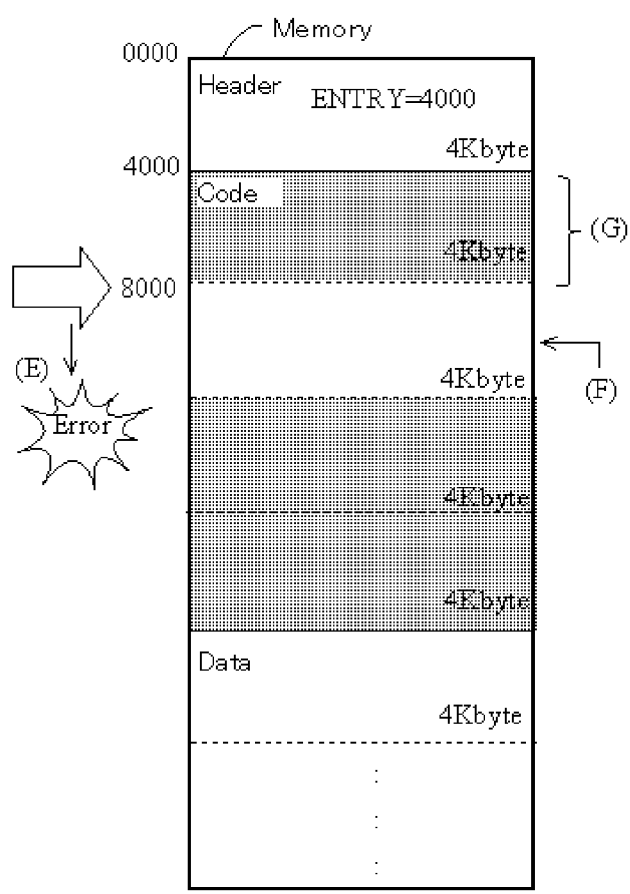
FIG. 5 is a diagram exemplifying a program placed in memory space (3).

0100 Memory management device
0101 HDD
0102 CPU
0103 MMU
0104 Main memory
0105 System bus
0106 Program file
0107 Paging file
0108 OS
0109 Application program
0110 Physical memory-virtual memory conversion table

What is claimed is:

1. A memory management method that is for processing code information of a program loaded into a virtual memory, the method comprising:
    encrypting the code information, and varying the code information to data, where data reading or data writing is impossible from a CPU;
    when receiving the data reading request or the data writing request by the CPU for the code information, executing an interrupt process;
    as a result of the execution of the interrupt process, varying the inaccessible state of a management unit of a memory management device including the encrypted area to an accessible state, and for decrypting the data; and
    when the data reading request or data writing request designates information of other management unit, executing a recursive process for re-encrypting the data of the management unit, where the data reading request or the data writing request has become possible by the step for executing the interrupt process.

2. The memory management method according to claim 1,
    wherein the encryption is executed before a program counter designates an entry address of an executable file upon program activation.

3. A non-transitory computer-readable storage medium storing a program for causing a computer to execute a process for code information of a program loaded into a virtual memory, comprising:
    encrypting the code information, and varying the code information to data, where data reading or data writing is impossible from a CPU;
    when receiving the data reading request or the data writing request by the CPU for the code information, executing an interrupt process and, as a result of the execution of the interrupt process, varying the inaccessible state of a management unit of a memory management device including the encrypted area to an accessible state, and for decrypting the data; and
    when the data reading request or data writing request designates information of other management unit, executing a recursive process for re-encrypting the data of the management unit, where the data reading request or the data writing request has become possible by the step for executing the interrupt process.

4. The non-transitory computer-readable storage medium according to claim 3,
    wherein the encryption is executed before a program counter designates an entry address of an executable file upon program activation.

* * * * *

UNITED STATES PATENT AND TRADEMARK OFFICE
CERTIFICATE OF CORRECTION

PATENT NO.         : 8,812,872 B2                                                Page 1 of 1
APPLICATION NO.    : 13/577570
DATED              : August 19, 2014
INVENTOR(S)        : Mutsumi Ogawa It is certified that error appears in the above-identified patent and that said Letters Patent is hereby corrected as shown below:

On the Title Page, Item (54) and in the Specification, in Column 1, line 1 please delete "MANAGMENT" and insert --MANAGEMENT--

Signed and Sealed this
Twenty-fourth Day of February, 2015

Michelle K. Lee
*Deputy Director of the United States Patent and Trademark Office*